(12) United States Patent
Seger

(10) Patent No.: US 6,572,356 B2
(45) Date of Patent: Jun. 3, 2003

(54) QUICK CHANGE TOOLING SYSTEM FOR A THERMOFORMING MOLD AND THE LIKE

(75) Inventor: Anthony C. Seger, Sidney, OH (US)

(73) Assignee: Tooling Technology, LLC, Huber Heights, OH (US)

( * ) Notice: Subject to any disclaimer, the term of this patent is extended or adjusted under 35 U.S.C. 154(b) by 322 days.

(21) Appl. No.: 09/756,029

(22) Filed: Jan. 8, 2001

(65) Prior Publication Data

US 2002/0090409 A1 Jul. 11, 2002

(51) Int. Cl.[7] .............................................. B29C 33/30
(52) U.S. Cl. ..................... 425/192 R; 425/193; 425/195
(58) Field of Search ................................ 425/186, 193, 425/195, 190, 192 R

(56) References Cited

U.S. PATENT DOCUMENTS 4,911,632 A * 3/1990 Mansfield ................... 425/183
5,647,713 A * 7/1997 Ge et al. .................... 411/509
5,750,161 A * 5/1998 Schock et al. .............. 425/468
6,499,985 B1 * 12/2002 Sekiguchi et al. .......... 425/186

\* cited by examiner

Primary Examiner—Robert Davis
Assistant Examiner—Thu Khanh T. Nguyen
(74) Attorney, Agent, or Firm—Jacox, Meckstroth & Jenkins

(57) ABSTRACT

A thermoformed mold is supported by a quick change tooling system including a pair of parallel spaced elongated channel members each defining an open bottom cavity for receiving in precision alignment an elongated rail member secured to a supporting press platen. Each channel member is releasably locked to its rail member by a pair of couplers each including a stud projecting downwardly in the channel member and received within a corresponding cylinder within the rail member. The cylinder has locking balls which releasably grip the stud in response to axial movement of a fluid actuated spring biased piston surrounding the cylinder.

20 Claims, 2 Drawing Sheets

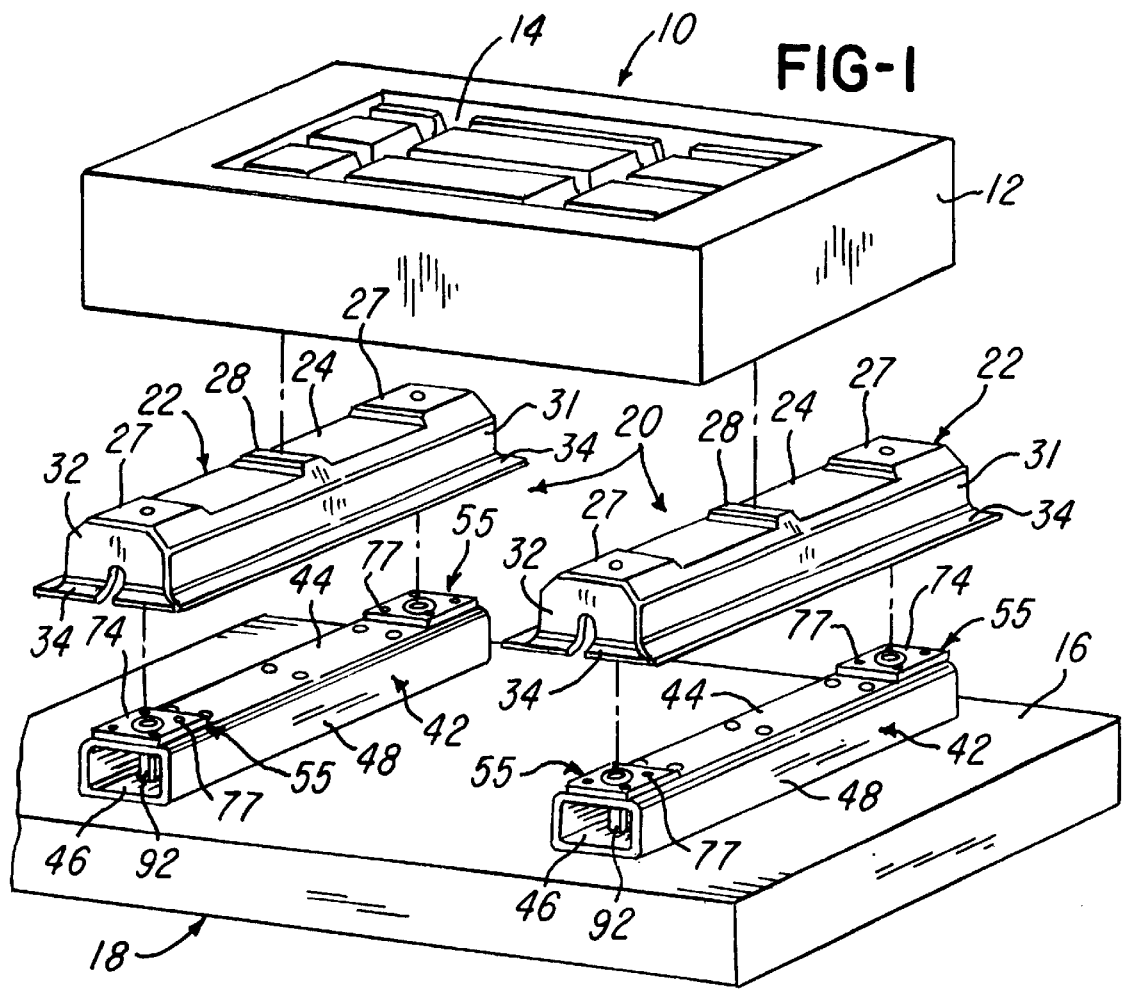
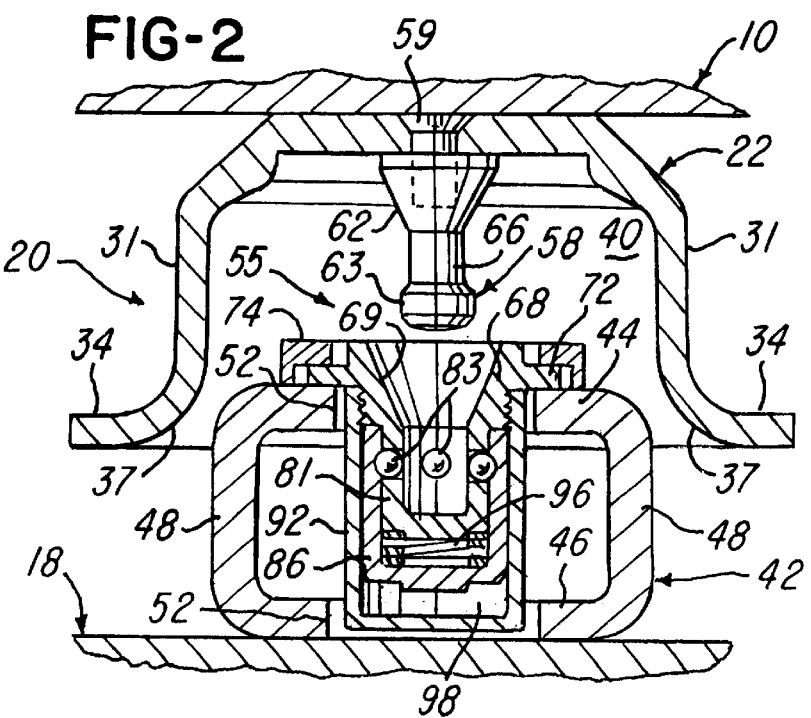

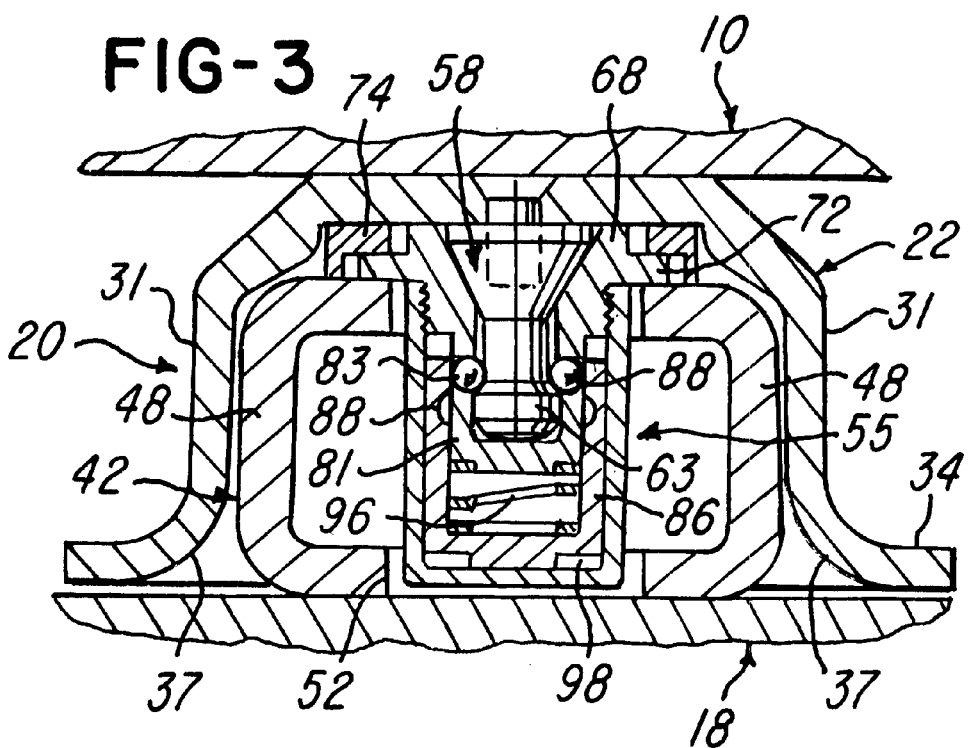

QUICK CHANGE TOOLING SYSTEM FOR A THERMOFORMING MOLD AND THE LIKE

BACKGROUND OF THE INVENTION

In the production of custom thermoformed articles or parts, such as parts produced by blow molding, vacuum molding, rotomolding, compression molding, resin transfer molding and reaction injection molding, it is frequently necessary to change the large and heavy tools or molds within the thermoforming press in order to produce different parts. Since the molds are normally positioned on and secured to a platen of the thermoforming press with bolts and/or clamps with bolts, it is necessary to remove each of the bolts and/or clamps and then manually slide the mold onto the forks of a forklift truck for transporting the mold to a storage location or rack. Another mold for producing another part is then picked up by the forklift truck and delivered to the thermoforming press where the second mold is manually positioned or aligned on the press platen and secured to the platen by the bolts and/or clamps. Commonly, the exchange or replacement of the molds, including the removal of the bolts and/or clamps from the first mold and the precise positioning or alignment of a second mold on the platen and the securing of the second mold with the bolts and/or clamps, requires substantial time, for example, sometimes up to two hours. During this period, the press is not operating, and the operator of the press is not producing.

SUMMARY OF THE INVENTION

The present invention is directed to an improved quick change tooling system which is ideally suited for use with thermoforming molds which have substantial weight and size. However, the system may also be used with other heavy and/or large tooling such as fixtures, whenever it is desirable to replace quickly one tooling with another tooling. The quick change tooling system of the invention provides for changing the tooling or molds in minutes instead of hours and thus minimizes down time of the molding press and non-productive time of the press operator. The quick change system of the invention further provides for accurately positioning the mold or other tooling on a platen and for quickly and positively locking the tooling to the platen in a predetermined position with precision alignment, thus eliminating the use of hand tools, bolts, clamps, shims and the like. In addition, the quick change tooling system of the invention is durable, accommodates thermal expansion of the tooling and provides for minimizing the inventory of parts produced on different tooling since the tooling set up time is minimized and a smaller number of parts may be produced more efficiently and more economically.

In accordance with one embodiment of the invention, a pair of inverted channel members are secured to the bottom surface of a mold, and the channel members define open bottom cavities which receive corresponding rail members secured to the top surface of a press platen. A precision fit is provided between the rail members and the channel members to obtain precise location and alignment of the mold on the press platen, and a set of air actuated locking couplers positively secure or lock the channel members to the rail members. Preferably, each of the locking couplers includes a knob or stud projecting downwardly within the cavity of the channel member. The stud has an enlarged head portion which is received within a locking cylinder having circumferentially spaced balls for engaging the head portion of the coupler stud. A spring loaded piston surrounds the balls and normally holds the balls in a locking position, and the balls retract to a released position in response to pressurized air acting on the piston.

Other features and advantages of the invention will be apparent from the following description, the accompanying drawings and the appended claims.

BRIEF DESCRIPTION OF THE DRAWINGS

FIG. 1 is a partially exploded view of a quick change tooling system constructed in accordance with the invention for precisely positioning and positively locking a thermoform mold on a press platen;

FIG. 2 is a fragmentary vertical section through the quick change tooling system shown in FIG. 1 and showing the alignment between channel and rail members with a locking coupler in its released position when the mold is elevated from the platen; and FIG. 3 is a fragmentary section similar to FIG. 2 and showing the tooling system in its coupled and locked position.

DESCRIPTION OF THE PREFERRED EMBODIMENT

FIG. 1 illustrates a thermoform mold 10 in the form of a vacuum mold including a body 12 defining a predetermined cavity 14, and having small holes or passages (not shown) connecting the bottom of the cavity to a vacuum chamber (not shown) within the mold body 12. It is understood that the vacuum mold 10 is for purpose of illustration only and that the quick change tooling system of the invention may be used with other thermoform molds or fixtures or other tooling.

In accordance with the illustrated embodiment of the invention, the mold 10 is precisely and quickly positioned and secured to a supporting surface 16 of a press platen 18 or other supporting surface by a quick change tooling system 20. The tooling system 20 includes a pair of spaced first support members in the form of parallel spaced and elongated channel members 22 each of which includes a body 24 cast of a metal such as aluminum. Each body 24 is cast with upwardly projecting end portions or pads 27 and a center projection or pad 28, and the pads are secured to the bottom surface of the mold body 12 by suitable fasteners such as screws or bolts (not shown). Each of the channel members 22 has longitudinally extending opposite side walls 31 and opposite end walls 32, and each wall 31 and 32 has an outwardly projecting bottom flange 34 to form a curved inner cam alignment surface 37 around the bottom peripheral of each channel member 22.

Each of the support or channel members 22 defines a longitudinally extending and open bottom cavity 40 which is adapted to receive a second support member in the form of an elongated rail member 42 secured by suitable fasteners such as screws or bolts (not shown) to the top surface 16 of the platen 18. Each rail member 42 is formed from a tubular aluminum extrusion having rounded corners and a generally rectangular cross-sectional configuration with a top wall 44 integrally connected to a bottom wall 46 by opposite side walls 48. As apparent from FIGS. 2 and 3, the inner surfaces of the side walls 31 of each channel member 22 define a cavity width which is slightly greater than the width defined by the outer surfaces of the side walls 48 of the corresponding rail member 42 so that the rail members 42 provide for precisely aligning and locating the mold 10 on the platen 18.

The same small clearances are also provided between the end walls 32 of the channel members 22 and the opposite end surfaces of the corresponding rail members 42 to provide precision lateral location of the mold 10 on the platen 18.

Each of the rail members 42 has a pair of longitudinal spaced and vertically aligned sets of holes 52 within the walls 44 and 46 adjacent opposite end portions of the rail member. Each set of vertically aligned holes 52 receives a locking coupler 55 preferably of the type manufactured and sold by Edward D. Segen and Co., LLC of Shelton, Conn. and referred to in its catalogue as a "Quick Change Cylinder Lock". Each of the locking couplings 55 includes a male portion in the form of a metal knob or stud 58 which is secured by a screw 59 to each of the pads 27 of each channel member 22 and projects downwardly into the cavity 40 of the channel member 22. Each knob 58 has a tapered or frusto-conical base portion 62 integrally connected to a head portion 63 by a neck portion 66 of reduced diameter.

Each of the locking couplers 55 also includes a female portion in the form of a cup-shaped cylinder 68 having a tapered internal surface 69 which mates with the tapered surface 62 of the stud 58. The cylinder 68 also has an outwardly projecting annular flange 72 which is retained by a surrounding square plate or collar 74 secured to the top wall 44 of the corresponding rail member 42 by a set of corner screws 77. The retainer collar 74 provides a slight clearance for the flange 72 so that the cylinder 68 may float laterally by a slight amount relative to the rail member 42. Each of the coupler cylinders 68 also has an integral cup-shaped cylindrical portion 81 which defines a cavity for receiving the head portion 63 of the corresponding stud 58, and a plurality of hardened steel locking balls 83 are retained within corresponding circumferentially spaced holes within the cylinder portion 81 for corresponding radial movement.

A cup-shaped piston 86 surrounds the portion 81 of the cylinder 68 and has a circumferentially extending groove or cavity 88 (FIG. 3) for receiving the balls 83 in their retracted positions when the piston 86 is in its released position (FIG. 2). A cylindrical cup-shaped housing 92 surrounds the piston 86 and has an upper end portion threadably connected to the cylinder 68. The housing 92 confines and supports the piston 86 for axial movement between an upper released position (FIG. 2) with the balls 83 retracted and a lower locked position (FIG. 3) when the balls 83 are cammed radially inwardly to engage the head portion 63 and neck portion 66 of the stud 58. A flat wire compression spring 96 normally urges the piston 86 downwardly to the locked position of the coupler 55 (FIG. 3). When it is desired to release each stud 58 from its cylinder 68, pressurized fluid or air is introduced into a chamber 98 defined below the piston 86 and within the housing 92 to force the piston upwardly against the bias of the spring 96 to the released position (FIG. 2). In this position, the balls 83 move radially outwardly into the cavity 88, allowing the stud 58 to be lifted or removed from its cylinder 68.

In operation of a quick change tooling system constructed in accordance with the invention, the first support members or channel members 22 are positively secured to the bottom surface of the mold 10 and provide for conveniently moving and transporting the mold with a forklift truck by extending the forks under the mold 10 between the channel members 22. The channel members 22 also provide for using the forklift truck to position the mold 10 within a storage rack. When it is desired to select another mold from the storage rack, the new mold, having a pair of channel members 22, is transported by the forklift truck to the press and is lowered downwardly with the channel members 22 on the mold generally aligned with the rail members 42 on the press platen 18.

Before the channel members 20 are lowered onto the rail members 42, pressurized air is supplied to the chambers 98 of the locking couplers 55 so that the locking balls 83 may shift to their retracted and released positions, as shown in FIG. 2. As the mold 10 and the channel members 22 are lowered with the forklift truck onto the rail members 42 on the platen 18, the curved cam surfaces 37 and rounded upper corners on the rail members 42 precisely align the mold 10 on the platen 18. After the channel members 22 are seated on the collar plates 74 of the rail members 42 (FIG. 3), the air pressure within the chambers 98 of the couplers 55 is released or exhausted, and the compression springs 96 move the pistons 86 downwardly to cam the balls 83 inwardly to their locking positions, as shown in FIG. 3. When it is desired to replace one mold 10 with another mold, pressurized air is supplied to the chambers 98 to release the couplers 55, and the above steps for removing one mold and replacing it with another mold are repeated.

From the drawings and the above description, it is apparent that a quick change tooling system constructed in accordance with the invention, provides desirable features and advantages. For example, the tooling system 20 provides for accurately and quickly positioning a thermoform mold on a press platen and for positively and quickly locking the mold to the platen. As a result, a change of molds or other tooling may be performed in minutes instead of hours so that the down time of the molding machine and the unproductive time of the machine operator are minimized. The quick change tooling system of the invention also eliminates the need for hand tools, bolts, clamps, shims and other such devices commonly used for locating and precisely aligning a mold or tooling on a press platen.

It is also apparent that the channel members 22 provide for conveniently transporting the mold 10 or other tooling with a forklift truck. Furthermore, the location of the locking studs 58 within the cavities 40 provides protection for the locking studs of the couplers 55, and the rail members 42 provide protection for the female portion of the locking couplers 55. The quick change tooling system also enables the inventory of parts produced on the thermoform molds to be minimized since different molds may be interchanged very quickly, and the different parts may be produced from the molds more efficiently and more economically. The laterally floating coupler cylinders 68 also provide for thermal expansion and contraction of a thermoform mold, and the compression springs 96 assure that the tooling system remains locked to the platen 18 unless air pressure is intentionally supplied to the chambers 98.

While the form of quick change tooling apparatus herein described constitutes a preferred embodiment of the invention, it is to be understood that the invention is not limited to this precise form of apparatus, and that changes may be made therein without departing from the scope and spirit of the invention as defined in the appended claims. For example, the channel members and rail members 42 may be replaced by separate support members for each locking coupler 55, such as an inverted circular cup-shaped support member for each locking stud 58 and a corresponding circular alignment block member for each locking cylinder 68.

What is claimed is:

1. A quick change tooling system adapted for use with a thermoform mold having substantial weight, comprising a plurality of spaced first support members each adapted to be rigidly secured to a bottom surface of the mold and defining an open bottom cavity, a corresponding plurality of spaced second support members adapted to be rigidly secured to a supporting platen and projecting upwardly into the corresponding said cavities of said first support members, each of said second support members having outer surfaces defining a width slightly less than the width of said cavity of the corresponding said first support member to provide for precision alignment of the mold on the platen, and at least one releasable locking coupler securing each of said first support members to the corresponding said second support member.

2. A tooling system as defined in claim 1 wherein each of said first support members has lower wall portions with inner tapering surfaces to assist in guiding said first support member onto the corresponding said second support member.

3. A tooling system as defined in claim 1 wherein each of said second support members has tapered upper corner surfaces for guiding the corresponding said first support member onto said second support member.

4. A tooling system as defined in claim 1 wherein each of said first support members and the corresponding said second support member are elongated and have corresponding opposite end portions supporting two of said locking couplers.

5. A tooling system as defined in claim 1 wherein each of said locking couplers comprises a stud mounted on said first support member and having an enlarged head portion projecting downwardly into the corresponding said cavity, and a locking cylinder mounted on said second support member and having a set of radially movable balls releasable engaging said head portion of said stud.

6. A tooling system as defined in claim 1 wherein each of said second support members is hollow and has top and side walls defining a chamber, and a portion of said coupler projects downwardly into said chamber.

7. A tooling system as defined in claim 1 wherein each of said couplers is supported for slight lateral movement on the corresponding said second support member.

8. A tooling system as defined in claim 1 wherein each of said couplers comprises a cylinder having holes supporting a plurality of circumferentially spaced balls for corresponding radial movement relative to a projecting stud on said first support member, a piston supported around said cylinder and having a recess for receiving said balls in a released position, a spring urging said piston to a locked position with said balls engaging a head portion of said stud, and a housing supporting said piston and cooperating to receive fluid pressure for moving said piston to a released position with said balls received within said recess.

9. A quick change tooling system adapted for use with a thermoform mold having substantial weight, comprising a plurality of parallel spaced elongated channel members each adapted to be rigidly secured to a bottom surface of the mold and defining an open bottom cavity, a corresponding plurality of parallel spaced elongated rail members adapted to be rigidly secured to a supporting platen and projecting upwardly into the corresponding said cavities of said channel members, each of said rail members having outer side surfaces defining a width slightly less than the width of said cavity of the corresponding said channel member to provide for precision alignment of the mold on the platen, and a plurality of releasable locking couplers securing each of said channel members to the corresponding said rail member.

10. A tooling system as defined in claim 9 wherein each of said channel members has lower wall portions with inner tapering surfaces to assist in guiding said channel member onto the corresponding said rail member.

11. A tooling system as defined in claim 9 wherein each of said rail members has tapered upper corner surfaces for guiding the corresponding said channel member onto said rail member.

12. A tooling system as defined in claim 9 wherein each of said channel members and the corresponding said rail member have corresponding opposite end portions supporting two of said locking couplers.

13. A tooling system as defined in claim 9 wherein each of said locking couplers comprises a stud mounted on said channel member and having an enlarged head portion projecting downwardly into the corresponding said cavity, and a locking cylinder mounted on the corresponding said rail member and having a set of radially movable balls releasable engaging said head portion of said stud.

14. A tooling system as defined in claim 9 wherein each of said rail members is tubular and defines a chamber, and a portion of said coupler projects downwardly into said chamber.

15. A tooling system as defined in claim 9 wherein each of said couplers is supported for slight lateral movement on the corresponding said rail member.

16. A tooling system as defined in claim 9 wherein each of said couplers comprises a cylinder having holes supporting a plurality of circumferentially spaced balls for corresponding radial movement relative to a stud projecting from one of said channel members, a piston supported around said cylinder and having a recess for receiving said balls in a released position, a spring urging said piston to a locked position with said balls engaging a head portion of said stud, and a housing supporting said piston and cooperating to receive fluid pressure for moving said piston to a released position with said balls received within said recess.

17. A quick change tooling system adapted for use with a thermoform mold having substantial weight, comprising a plurality of spaced first support members each adapted to be rigidly secured to a bottom surface of the mold and defining an open bottom cavity, a corresponding plurality of spaced second support members adapted to be rigidly secured to a supporting platen and projecting upwardly into the corresponding said cavities of said first support members, each of said second support members having outer surfaces defining a width slightly less than the width of said cavity of the corresponding said first support member to provide for precision alignment of the mold on the platen, at least one releasable locking coupler securing each of said first support members to the corresponding said second support member, each of said locking couplers including a stud mounted on one of said support members and having an enlarged head portion, and a fluid actuated locking cylinder mounted on the other of said support members and having a set of radially movable balls releasable engaging said head portion of said stud.

18. A tooling system as defined in claim 17 wherein each of said first support members has lower wall portions with inner sloping surfaces to assist in guiding said first support member onto the corresponding said second support member.

19. A tooling system as defined in claim 17 wherein each of said second support members has sloping upper corner surfaces for guiding the corresponding said first support member onto said second support member.

20. A tooling system as defined in claim 17 wherein each of said first support members and the corresponding said second support member are elongated and have corresponding opposite end portions supporting two of said locking couplers.

* * * * *